United States Patent [19]

Yamazaki

[11] Patent Number: 5,535,023
[45] Date of Patent: Jul. 9, 1996

[54] METHOD OF READING HOLOGRAM INFORMATION

[75] Inventor: Satoshi Yamazaki, Tokyo, Japan

[73] Assignee: Dai Nippon Printing Co., Ltd., Tokyo, Japan

[21] Appl. No.: 217,938

[22] Filed: Mar. 25, 1994

Related U.S. Application Data

[63] Continuation-in-part of Ser. No. 992,704, Dec. 18, 1992, abandoned.

[30] Foreign Application Priority Data

Dec. 20, 1991 [JP] Japan ................................. 3-338783

[51] Int. Cl.⁶ ............................................. G03H 1/00
[52] U.S. Cl. .............................. 359/2; 359/15; 359/25; 359/900; 235/457; 235/470
[58] Field of Search ............................. 359/2, 15, 25, 359/900; 235/457, 458; 250/550; 356/71

[56] References Cited

U.S. PATENT DOCUMENTS

| | | | |
|---|---|---|---|
| 4,014,602 | 3/1977 | Ruell | 359/2 |
| 4,108,367 | 8/1978 | Hannan | 359/2 |
| 4,295,162 | 10/1981 | Carlsen | 358/128.6 |
| 4,400,616 | 8/1983 | Chevillat et al. | 359/34 |
| 4,677,285 | 6/1987 | Taniguchi | 235/488 |
| 4,748,316 | 5/1988 | Dickson | 235/457 |
| 4,820,006 | 4/1989 | Constant | 359/2 |
| 4,945,215 | 7/1990 | Fukushima et al. | 235/457 |
| 4,983,819 | 1/1991 | Hashimoto | 235/457 |
| 5,059,776 | 10/1991 | Antes | 359/2 |
| 5,200,794 | 4/1993 | Nishiguma et al. | 356/71 |
| 5,374,816 | 12/1994 | Bianco | 235/457 |
| 5,461,239 | 10/1995 | Atherton | 250/566 |

FOREIGN PATENT DOCUMENTS

| | | | |
|---|---|---|---|
| 0043509 | 6/1981 | European Pat. Off. | G03H 1/00 |
| 0085642 | 5/1986 | Japan | 235/457 |
| 405174176 | 7/1993 | Japan | 235/457 |
| 406096259 | 4/1994 | Japan | 235/457 |

OTHER PUBLICATIONS

R. L. Lamberts et al, "Digital Data Recording on Film by Using Superimposed Grating Patterns. I. General Theory and Procedures", *Photographic Science And Engineering*, vol. 10, No. 4, Aug. 1966, pp. 209–213.

K. Hacking, "Some Experiments in Digital Holographic Recording", *Proceedings of the Conference on Video and Data Recording*, Jul. 27, 1979, University of Southampton, Hants, UK, pp. 329–338.

*Primary Examiner*—Paul M. Dzierzynski
*Assistant Examiner*—John Juba, Jr.
*Attorney, Agent, or Firm*—Dellett and Walters

[57] ABSTRACT

A method of photoelectrically reading information recorded in the form of a Fresnel hologram, which makes it possible to eliminate the effect on the reading accuracy of a scratch, a stain, etc., on the hologram surface when the recorded information is reconstructed by applying a light beam having a small diameter to the hologram. The surface of the hologram is illuminated by scanning it with a light beam having a cross-section smaller than the hologram recording region, thereby reconstructing and reading the same recorded information separately from different hologram regions, and thus compensating for momentary disability to reconstruct the recorded information due to a scratch or stain. At the same time, since a light beam having a small beam diameter is used for reconstruction, the depth of focus of the reconstructed image increases, so that the number of restrictions on the installation position of the read sensor decreases.

6 Claims, 2 Drawing Sheets

METHOD OF READING HOLOGRAM INFORMATION

This is a continuation-in-part of application Ser. No. 07/992,704 filed on Dec. 18, 1992, now abandoned.

Background of the Invention

The present invention relates to a method of mechanically reading information recorded in the form of holograms. More particularly, the present invention relates to a hologram information reading method which is less affected by scratches, stains, etc. on the hologram surface.

The present applicant has proposed in Japanese Patent Application Nos. 3-304522 (1991) and 3-327683 (1991), a hologram information reading method wherein a beam of light having a small beam diameter is applied to a hologram containing the record of bar code-shaped patterns to thereby reconstruct the recorded patterns. When a hologram is reconstructed by illuminating it with a light beam having a small diameter, the depth of focus of the reconstructed image increases, resulting in a reduction in the dependence of the resolution of the reconstructed image on the light detecting position. Thus, such a reading method is advantageous in that the number of restrictions on the installation position of the read sensor decreases.

Further, a method wherein an image reconstructed from a hologram is sequentially detected with a detector by scanning has heretofore been known in U.S. Pat. No. 4,820,006. There has also been known an information reading method in U.S. Pat. No. 4,108,367, in which diffraction gratings, which have been formed in bar code-shaped regions by interference between two parallel beams of light, are illuminated with a light beam which is moved relative to the bar code-shaped regions, and diffracted light from each bar code-shaped region is read to thereby read information recorded in the form of a bar code.

With these conventional methods, however, when illuminating light that is used for reading is in the form of a beam having a small diameter, if there is a scratch, a stain or the like on the recording surface in the illuminated region, no diffracted light may be obtained, or the quantity of diffracted light may be reduced. Therefore, there is likelihood that the recorded information will be impossible to read or it will be read erroneously.

SUMMARY OF THE INVENTION

In view of the above-described circumstances, it is an object of the present invention to provide a hologram information reading method wherein when a hologram is illuminated with a beam of light having a small diameter to reconstruct information recorded thereon, the light beam is moved to scan the hologram surface, thereby eliminating the effect on the reading accuracy of a scratch, a stain, etc., on the hologram surface.

To attain the above-described object, the present invention provides a method of photoelectrically reading information recorded in the form of a Fresnel hologram, wherein the hologram surface is illuminated by scanning it with a beam of light having a cross-section smaller than a hologram recording region, thereby reconstructing and reading the same recorded information separately from different hologram regions.

Preferably, the recorded information is a pattern comprising a plurality of parallel bars, for example, and the light beam is moved to scan in a direction parallel to each bar.

Further, the hologram is moved relative to the light beam in a direction intersecting the scanning direction. The hologram may be provided on a card. In such a case, it is possible to judge whether the card is genuine or a forgery from the recorded information.

It is also possible to detect zero-order diffracted light from the hologram and to sense a hole punched in the hologram from the interrupting time of the zero-order diffracted light simultaneously with the reading of the recorded information.

According to the present invention, the hologram surface is illuminated by scanning it with a light beam having a cross-section smaller than the hologram recording region, thereby reconstructing and reading the same recorded information separately from different hologram regions. Therefore, even if there is a scratch or a stain in a specific illuminated region on the hologram, since the beam of illuminating light also illuminates scratch- or stain-free portions in the neighborhood of the specific region before and after it to reconstruct the recorded information, it is possible to compensate for momentary disability to reconstruct the recorded information due to the scratch or stain. At the same time, since a light beam having a small beam diameter is used for reconstruction, the depth of focus of the reconstructed image increases, so that the number of restrictions on the installation position of the read sensor decreases.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION

The hologram information reading method of the present invention will be described below by way of embodiments and with reference to the accompanying drawings.

Figure 1:
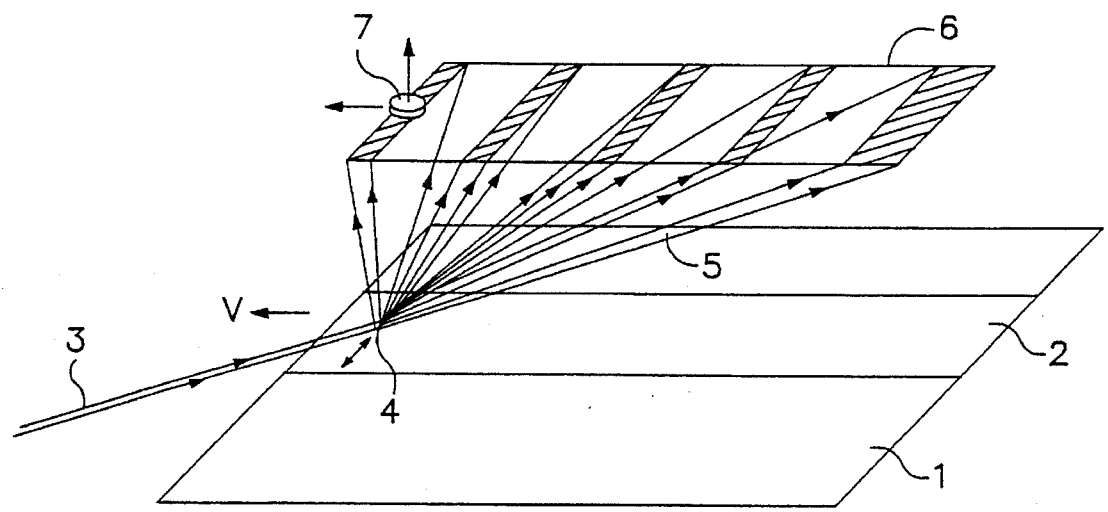
FIG. 1 is a perspective view showing a method of reading a card provided with a Fresnel hologram containing the record of a bar code.
Figure 2:
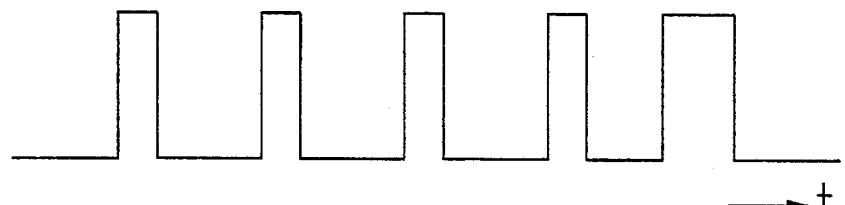
FIG. 2 shows a waveform of one example of a signal obtained by the reading method shown in FIG. 1.

FIG. 1 is a perspective view showing a method of reading a card provided with a Fresnel hologram containing the record of a bar code. A card 1 has a Fresnel hologram 2, which contains the record of a bar code, attached to a stripe region thereof. The surface of the hologram 2 is illuminated with a beam of reconstructing light 3 having a small beam diameter. Diffracted light 5 from a minute illuminating region 4 reconstructs a bar code pattern 6 having bars extending across the stripe region 2. When the card 1 is fed in the longitudinal direction of the stripe region 2 with the reconstructing light 3 fixed, the reconstructed bar code pattern 6 also moves in the same direction. Therefore, if a light-receiving element 7 is disposed at the position where the bar code pattern 6 is reconstructed, a read signal such as that shown in FIG. 2 is obtained as the card 1 moves.

Figure 3:
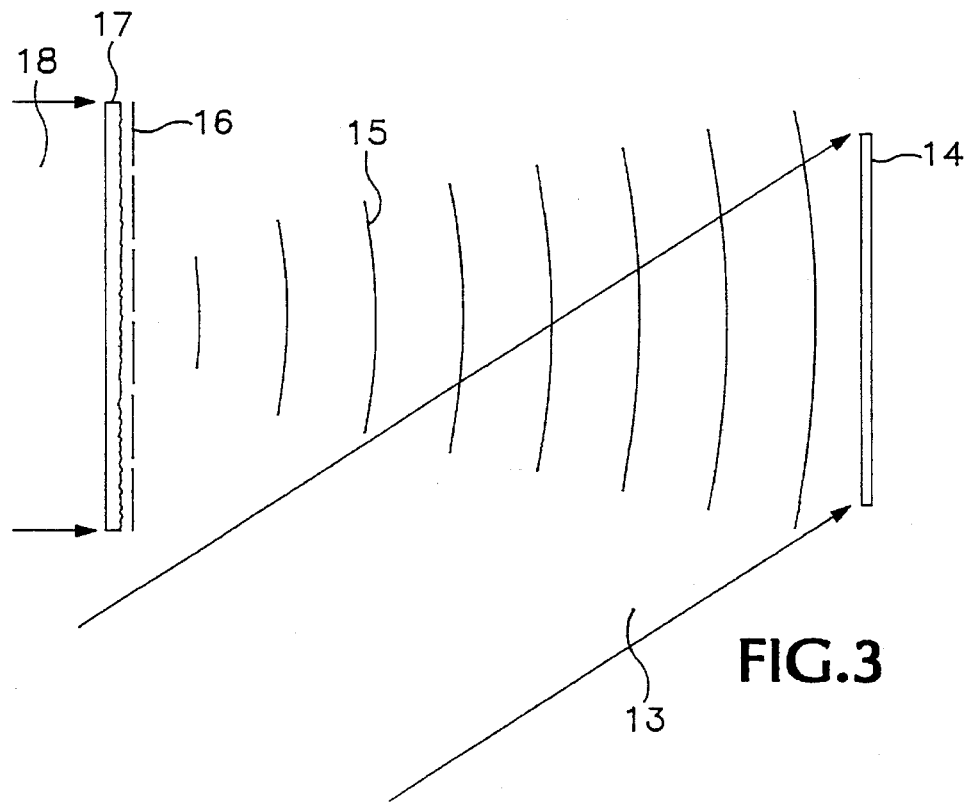
FIG. 3 shows an optical arrangement for photographically recording a hologram which may be provided on the card shown in FIG. 1.

The Fresnel hologram 2 containing the record of the bar code pattern 6 may be photographically recorded by an optical arrangement such as that shown in FIG. 3. That is, illuminating light 18 is applied through a diffuser 17 to a mask 16 having a plurality of parallel bar-shaped openings extending perpendicularly to the plane of the figure, and object light 15 from the mask 16 and a parallel beam of reference light 13 are allowed to interfere with each other on a photosensitive material 14, thereby recording the resulting interference fringe pattern. Then, the photosensitive material 14 having the record of the interference fringe pattern is developed to obtain a hologram 2. The hologram 2 thus obtained is cut in parallel to the plane of the figure into a stripe-shaped piece, which is then attached to a card 1, thereby obtaining the card 1 as shown in FIG. 1.

When the hologram 2 containing the record of the bar code pattern 6 is merely viewed under white light, the bar code pattern 6 is invisible. However, when the hologram 2 is illuminated with reconstructing light 3 (see FIG. 1) of the same wavelength as that of the parallel beam of reference light 13 at the same angle as in the recording process, but in the opposite direction to that of the reference light 13, an image of the bar code pattern 6 is reconstructed at the position of the mask 16 used during the photographic recording. In addition, the hologram 2 has redundancy of the hologram whereby the whole bar code pattern 6 is reconstructed with the positional relationship between the hologram recording region and the mask 16 established at the time of the photographic recording no matter which minute recording region of the hologram 2 is partially illuminated with reconstructing light 3 in the form of a beam having a small diameter during the reconstruction.

Thus, the bar code recorded on the hologram 2 can be read. However, if there is a scratch or a stain in the illuminating region 4, no diffracted light 5 may be obtained. There is therefore likelihood that the bar code pattern 6 will be impossible to read accurately. Therefore, in the present invention, the reading operation is carried out by moving the illuminating region 4 so as to scan in a direction perpendicular to the direction of movement of the card 1, as shown by the double-headed arrow in FIG. 1.

Figure 4:
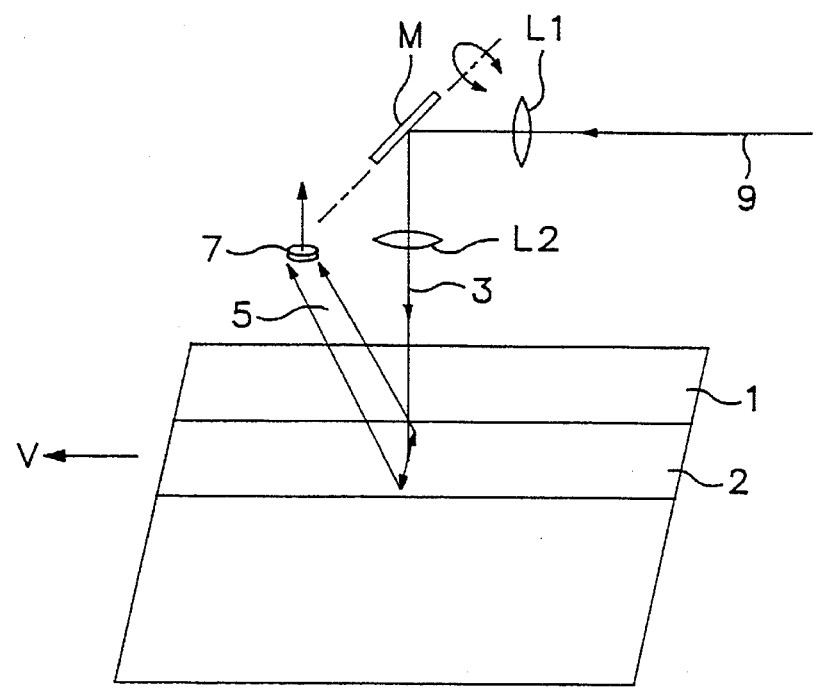
FIG. 4 shows schematically the arrangement of an optical system for carrying out one embodiment of the reading method according to the present invention.

FIG. 4 shows the arrangement of one example of an optical system for reading hologram information by moving the illuminating region 4 of reconstructing light in a scanning manner. A card 1 has a Fresnel hologram 2, which contains the record of a bar code, attached to a stripe region thereof, and the bars of a bar code pattern reconstructed from the hologram 2 extend across the stripe region 2, in the same way as in the case of the arrangement shown in FIG. 1. The card 1 is fed at speed V in the longitudinal direction of the stripe region 2. Reconstructing light 3, which is to be applied to the hologram 2, is formed by first condensing a narrowed-down beam of parallel rays 9 through a lens L1, reflecting the beam 9 by using a galvanomirror M, which is disposed at the focal point of the lens L1, and then converting the divergent light, which is reflected from the galvanomirror M, into a narrow beam of parallel rays through a lens L2. By oscillating the galvanomirror M as shown in the figure, the reconstructing light 3 scans the surface of the hologram 2 in a direction perpendicular to the direction of movement of the card 1. The scanning speed is set at a much higher level than the speed V of movement of the card 1.

Even if there is a scratch or a stain in a specific illuminated region on the hologram 2, since the reconstructing light 3 in the form of a beam having a small diameter also illuminates scratch- or stain-free portions in the neighborhood of the specific region before and after it during the scanning operation, which is carried out at high speed, the bar code pattern 6 is successfully reconstructed in a predetermined positional relation to the card 1 at all times by virtue of the redundancy of the hologram 2 and read by the light-receiving element 7. In other words, since a large number of points on the hologram 2 are read by scanning it with reconstructing light 3 having a small beam diameter, it is possible to compensate for momentary disability to reconstruct the recorded information due to a scratch or a stain. In addition, since a light beam having a small diameter is used for reconstruction, the reconstructed image is unlikely to be out of focus. Thus, it is possible to obtain satisfactorily sharp reconstructed images at all times.

Figure 5:
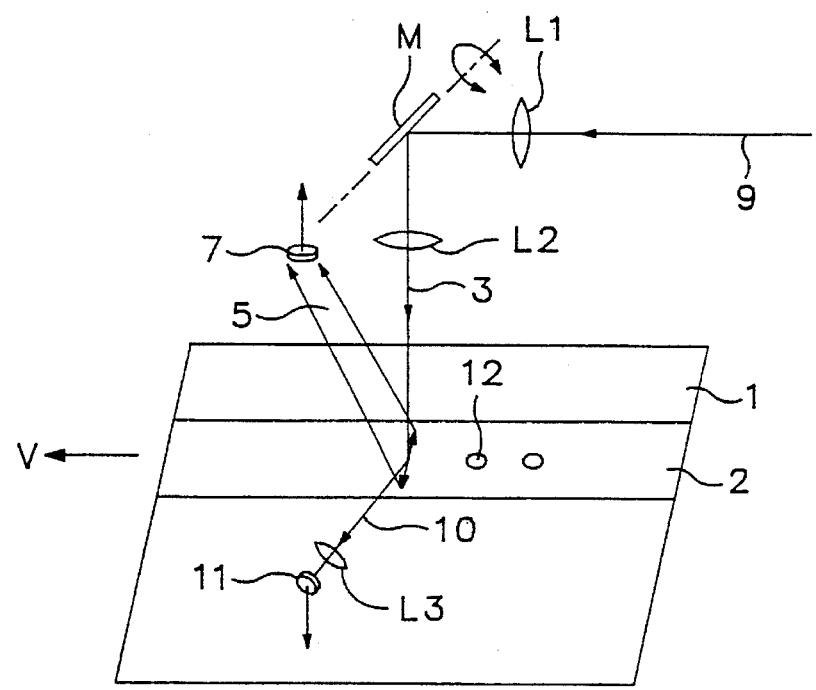
FIG. 5 shows schematically the arrangement of an optical system for carrying out another embodiment of reading method according to the present invention.

Incidentally, according to the above-described reading method, it is possible to read hologram information and, at the same time, detect a hole which may be punched in the hologram region 2 of a prepaid card, for example, to record and display a number of times of use or other information. For this purpose, a lens L3, and a light-receiving element 11, which is provided at the focal point of the lens L3, are disposed so as to detect zero-order diffracted light 10 regularly reflected from the hologram 2, as shown exemplarily in FIG. 5. If the hologram 2 is provided with a punched hole 12, no zero-order diffracted light 10 is available for a predetermined period of time, which is determined by the diameter of the punched hole 12. Therefore, the punched hole 12 can be recognized by detecting the absence of the zero-order diffracted light 10 from the signal obtained from the light-receiving element 11. It should be noted that the punched hole 12 can be distinguished from a scratch or a stain by detecting the interrupting time of the signal obtained from the light-receiving element 11.

The Fresnel hologram, which is employed in the present invention, is preferably recorded in the form of surface relief or dimple patterns, because with this recording form a large number of holograms can be duplicated at relatively low cost and, further, the angle of incidence of reconstructing light applied to reconstruct the hologram image is less dependent on the angle of incidence of reference light applied during the photographic recording of the hologram. To record a hologram in the form of surface relief patterns, a photoresist, for example, Bichroposit 1300, available from Supray (U.S.A.), or OFPR, available from Tokyo Applied Chemistry Co., Ltd., may be used as a photosensitive material. On the photosensitive material, a distribution of light intensities corresponding to interference fringes produced by interference between object light and reference light is recorded in the form of surface relief patterns, thereby forming a relief hologram. Then, the relief surface is plated with nickel, for example, to produce a relief stamper, with which an embossed hologram is duplicated by a known method. Then, Al, ZnS, or $TiO_2$, is deposited on the relief pattern surface of the duplicate to form a reflecting layer, thereby obtaining the desired hologram.

Although the hologram information reading method of the present invention has been described by way of an example in which the present invention is applied to reading of a Fresnel hologram containing the record of a bar code, it should be noted that the present invention may also be applied to reading of holograms containing the record of various other information. Further, the present invention is not necessarily limited to the above-described embodiments, and various changes and modifications may be imparted thereto. In addition, any kind of information may be recorded on holograms concerned with the reading method of the present invention, for example, information used to judge whether the card concerned is genuine or a forgery. Cards which may be provided with holograms include various kinds of card, for example, cash dispenser cards, prepaid cards, commuter passes, etc.

As will be clear from the foregoing description, according to the hologram information reading method of the present invention, the hologram surface is illuminated by scanning it with a light beam having a cross-section smaller than the hologram recording region, thereby reconstructing and reading the same recorded information separately from different hologram regions. Therefore, even if there is a scratch or a stain in a specific illuminated region on the hologram, since the beam of illuminating light also illuminates scratch- or stain-free portions in the neighborhood of the specific region before and after it to reconstruct the recorded information, it is possible to compensate for momentary disability to reconstruct the recorded information due to the scratch or stain. At the same time, since a light beam having a small beam diameter is used for reconstruction, the depth of focus of the reconstructed image increases, so that the number of restrictions on the installation position of the read sensor decreases.

I claim:

1. A method of photoelectrically reading recorded information in the form of a pattern comprising a plurality of parallel bars, recorded in a Fresnel hologram, said method comprising illuminating the hologram surface by scanning it with a beam of light having a cross-section smaller than a hologram recording region, wherein the same recorded information is reconstructed and read separately from different hologram regions and said light beam is moved to scan the hologram in a direction parallel to each bar as reconstructed, and moving said hologram relative to said light beam in a direction intersecting said scanning direction.

2. A hologram information reading method according to claim 1, wherein said hologram is provided on a card.

3. A hologram information reading method according to claim 2, further comprising judging whether the card is genuine or a forgery from said recorded information.

4. A hologram information reading method according to claim 1, further comprising detecting zero-order diffracted light from said hologram to sense a hole punched in said hologram from an interrupting time of the zero-order diffracted light simultaneously with the reading of said recorded information.

5. A hologram information reading method according to claim 2, further comprising detecting zero-order diffracted light from said hologram to sense a hole punched in said hologram from an interrupting time of the zero-order diffracted light simultaneously with the reading of said recorded information.

6. A hologram information reading method according to claim 3, further comprising detecting zero-order diffracted light from said hologram to sense a hole punched in said hologram from an interrupting time of the zero-order diffracted light simultaneously with the reading of said recorded information.

* * * * *